(12) United States Patent
Henderson (10) Patent No.: US 7,871,089 B1
(45) Date of Patent: Jan. 18, 2011

(54) TRASH CONTAINER HAND TRUCK SYSTEM

(76) Inventor: Hilton J. Henderson, 2/28 Breakwater Rd., East Geelong (AU) 3219

( * ) Notice: Subject to any disclaimer, the term of this patent is extended or adjusted under 35 U.S.C. 154(b) by 508 days.

(21) Appl. No.: 11/870,832

(22) Filed: Oct. 11, 2007

(51) Int. Cl.
*B62B 1/00* (2006.01)

(52) U.S. Cl. .................. 280/47.27; 280/659; 280/78; 280/47.32

(58) Field of Classification Search .......... 280/659, 280/78, 47.27, 47.32, 767, DIG. 3, DIG. 4; 220/908; 180/908, 19.1–19.3, 15, 16, 11–13
See application file for complete search history.

(56) References Cited

U.S. PATENT DOCUMENTS

| | | | |
|---|---|---|---|
| 1,155,081 A * | 9/1915 | More .................. | 414/456 |
| 2,510,676 A | 2/1947 | Biek | |
| 3,992,034 A | 11/1976 | Smith, Sr. et al. | |
| 4,019,597 A * | 4/1977 | Carmichael .......... | 180/11 |
| 4,135,725 A | 1/1979 | DiRoma | |
| 4,257,729 A | 3/1981 | Morissette | |
| 4,609,200 A * | 9/1986 | Winter ................ | 280/5.2 |
| 4,793,623 A | 12/1988 | Talbot | |
| D303,443 S | 9/1989 | Shoctor | |
| 4,981,412 A * | 1/1991 | Hawkins ............. | 414/490 |
| 5,323,923 A * | 6/1994 | Schauer .............. | 220/831 |
| 5,415,420 A | 5/1995 | Koeller | |
| 5,445,399 A * | 8/1995 | Salvucci, Sr. ........ | 280/47.27 |
| 6,295,946 B1 * | 10/2001 | Kasik ................ | 116/303 |
| D532,176 S | 11/2006 | Dltmars, Jr. | |
| 7,168,714 B2 * | 1/2007 | Gibbs ................. | 280/47.34 |
| 2001/0045371 A1 * | 11/2001 | Ordonez ............. | 206/499 |
| 2003/0155366 A1 * | 8/2003 | Raghunathan ....... | 220/835 |

* cited by examiner

*Primary Examiner*—J. Allen Shriver, II
*Assistant Examiner*—Katy Meyer (57) ABSTRACT

A trash container hand truck system includes a container that has a bottom wall and a peripheral wall. Wheels are attached to the peripheral wall and a cover is hingedly coupled to the container. A post has a bottom end, a top end and a front side. A plate is attached to the front side of the post adjacent to the bottom end. The plate is positionable under the bottom wall. A support is attached to the post and extends laterally away in opposite directions from the front side of the post. A pair of hooks is attached to the support and engage the handle. An arm has a first end and a second end. The first end is hingedly coupled to the post and extends rearward of the front side. A wheel is rotatably coupled to the second end of the arm.

9 Claims, 7 Drawing Sheets

TRASH CONTAINER HAND TRUCK SYSTEM

BACKGROUND OF THE INVENTION

Field of the Invention

The present invention relates to trash bin dolly devices and more particularly pertains to a new trash bin dolly device for assisting a person in the transportation of a container.

SUMMARY OF THE INVENTION

The present invention meets the needs presented above by generally comprising a container that has a bottom wall and a peripheral wall attached to and extending upwardly from the bottom wall. Wheels are attached to the peripheral wall adjacent to the bottom wall. A cover is hingedly coupled to the container to selectively open or close the container. A post has a bottom end, a top end and a front side. A plate is attached to the front side of the post and extends forward thereof. The plate is positionable under the bottom wall to engage the container. A support is attached to the post and extends laterally away in opposite directions from the front side of the post. A pair of hooks is provided. Each of the hooks includes a base portion and a curved portion. The base portions of the hooks are attached to the support so that the curved portions extend forward of the front side of the post. The curved portions have a free end directed downwardly toward the plate. The hooks engage the handle. An arm has a first end and a second end. The first end is hingedly coupled to the post and extends rearward of the front side. A wheel is rotatably coupled to the second end of the arm.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
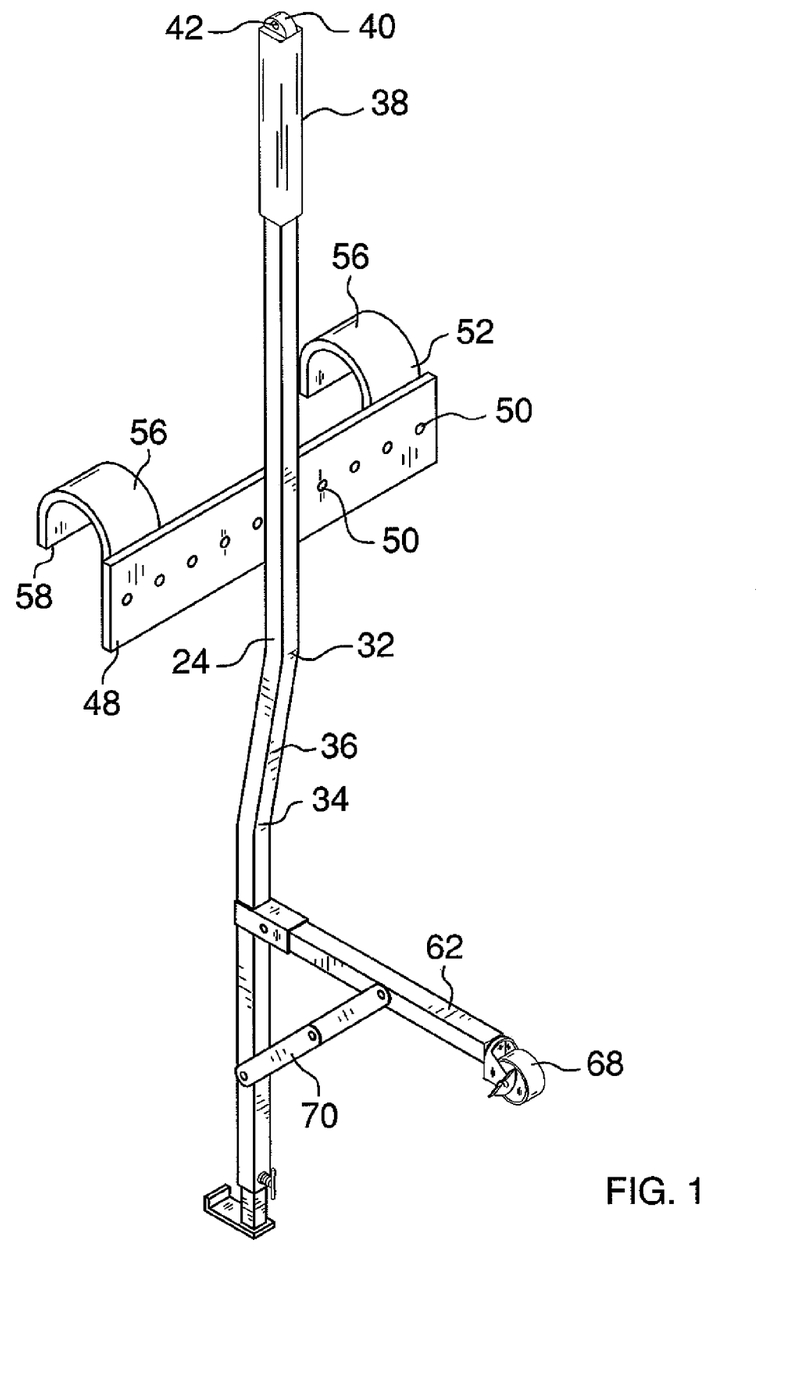
FIG. 1 is a rear perspective view of a trash container hand truck system according to the present invention.
Figure 2:
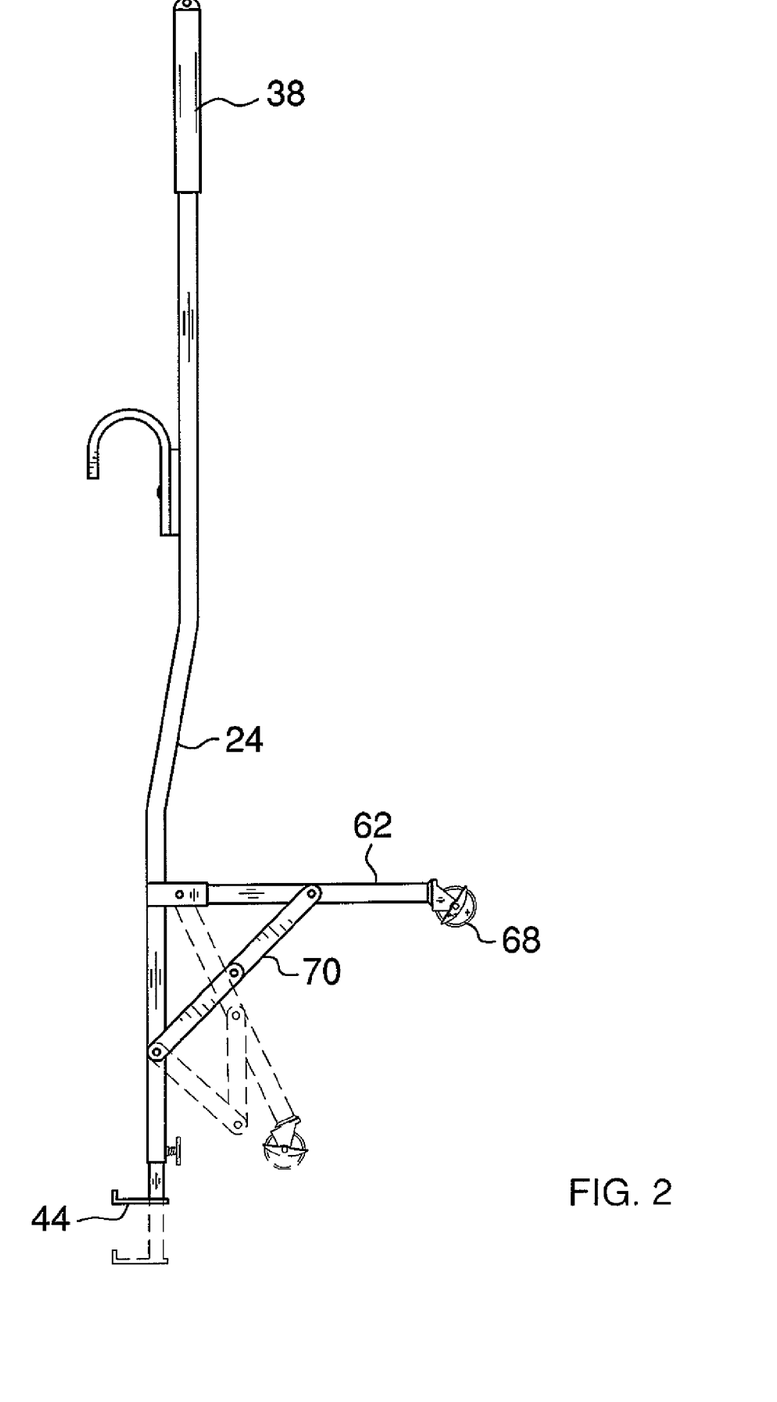
FIG. 2 is a side view of the present invention.
Figure 3:
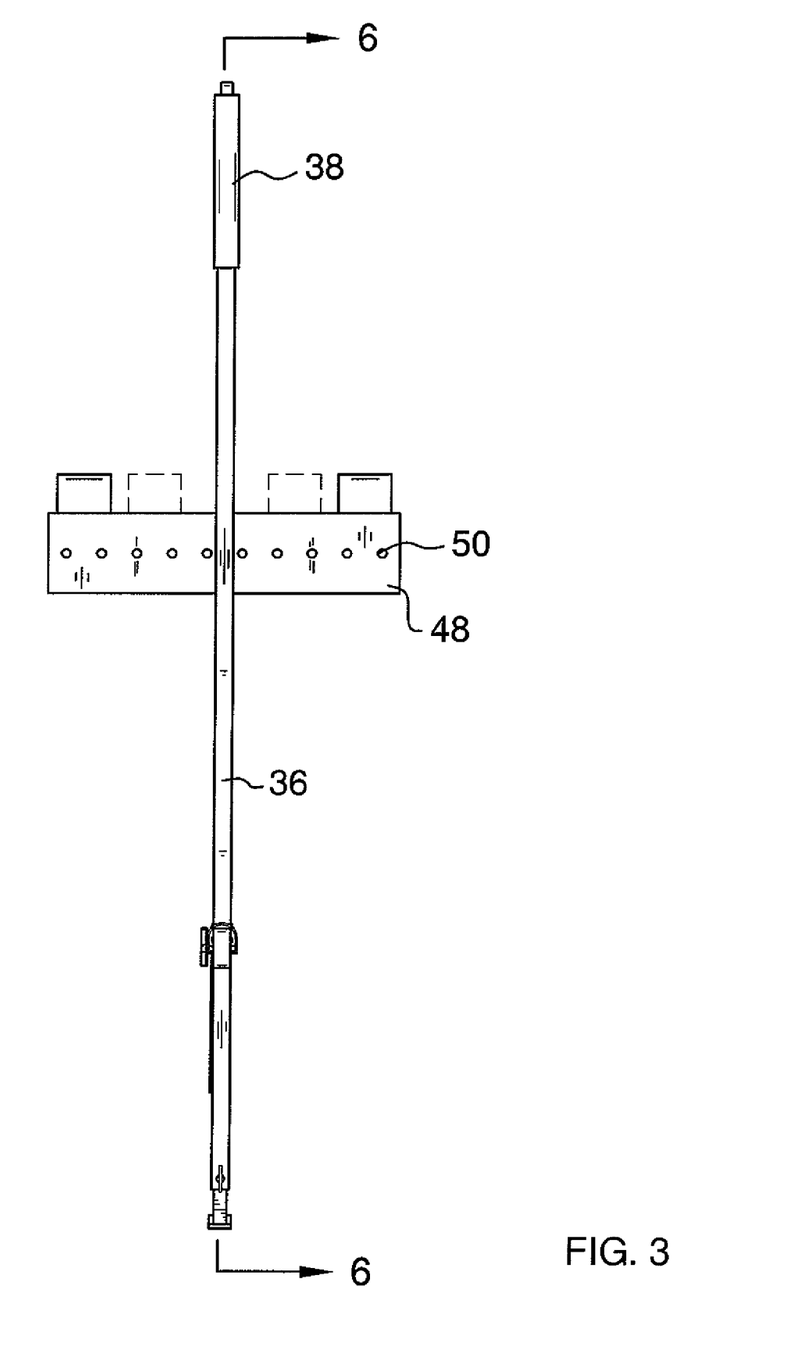
FIG. 3 is a rear view of the present invention.
Figure 4:
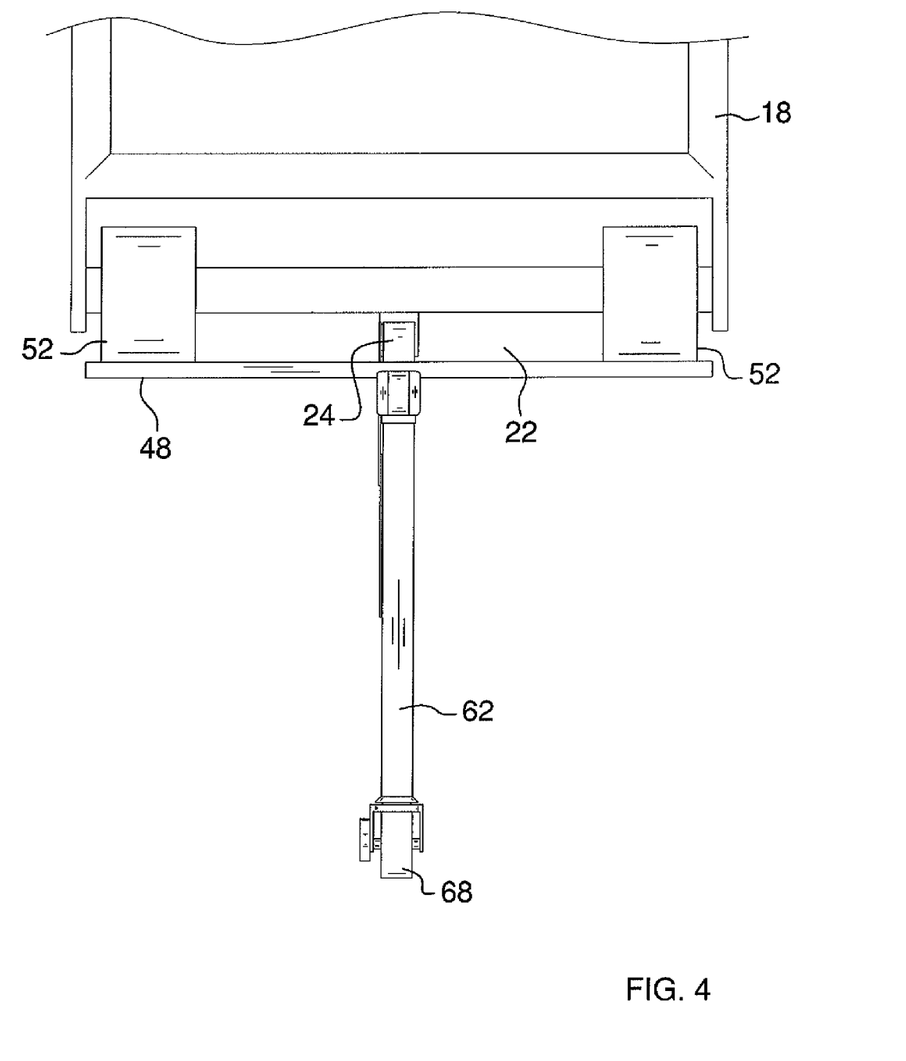
FIG. 4 is a top in-use view of the present invention.
Figure 5:
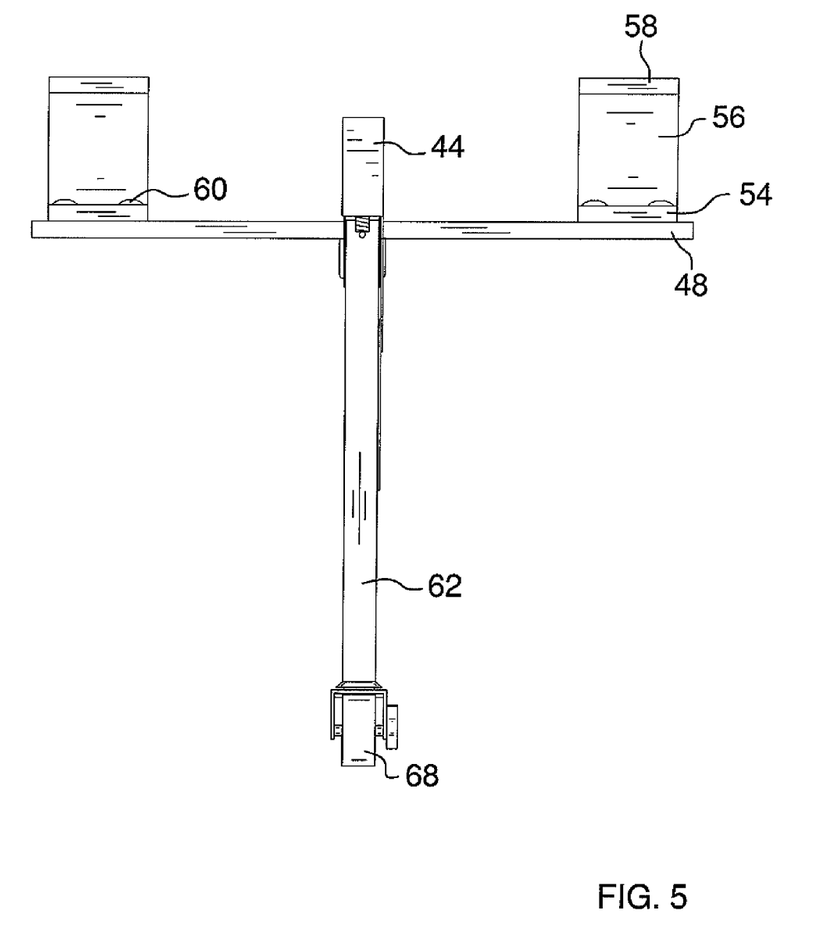
FIG. 5 is a bottom view of the present invention.
Figure 6:
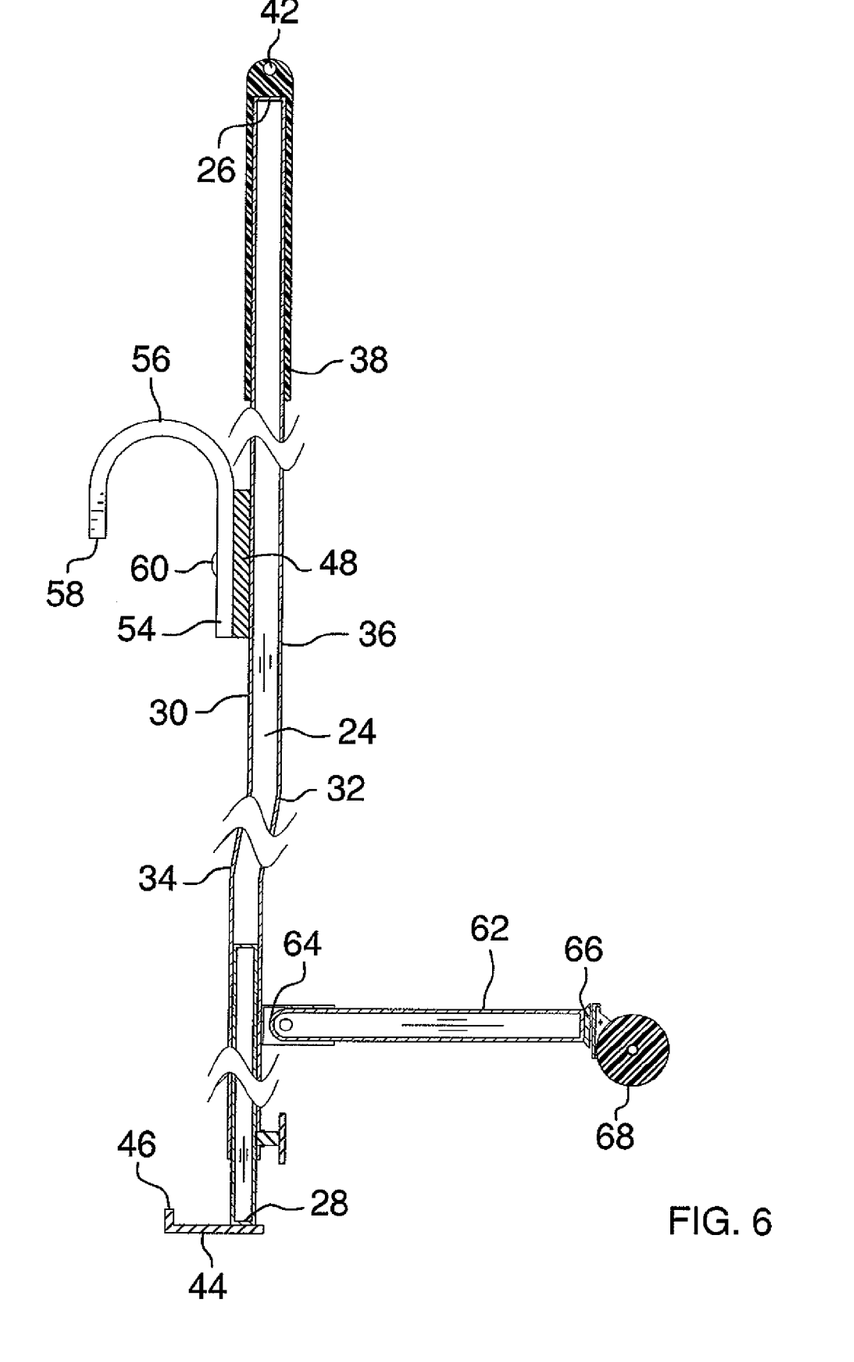
FIG. 6 is a cross-sectional view taken along line 6-6 of FIG. 3 of the present invention.
Figure 7:
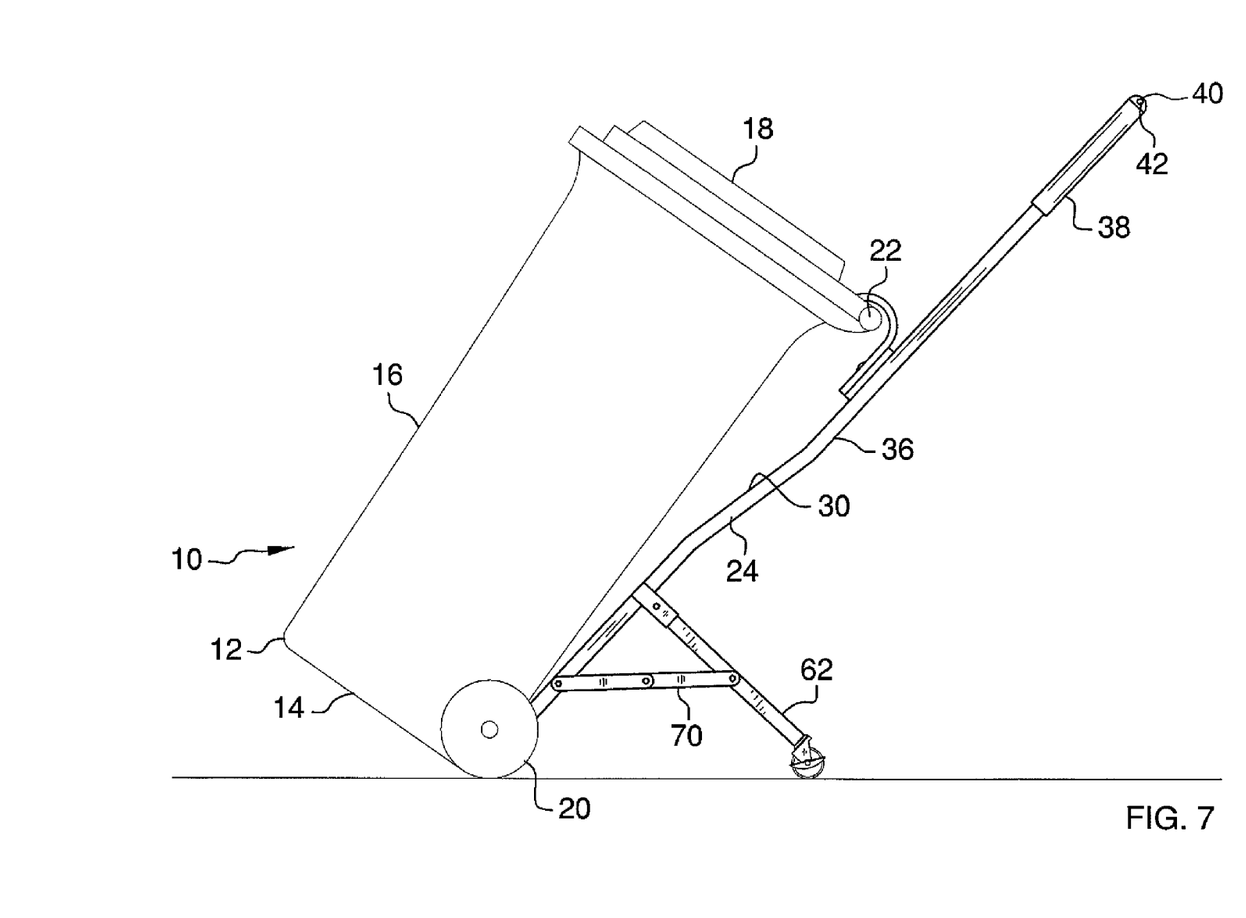
FIG. 7 is a side in-use view of the present invention.

With reference now to the drawings, and in particular to FIGS. 1 through 7 thereof, a new trash bin dolly device embodying the principles and concepts of the present invention and generally designated by the reference numeral 10 will be described.

As best illustrated in FIGS. 1 through 7, the trash container hand truck system 10 generally comprises a container 12 has a bottom wall 14 and a peripheral wall 16 that is attached to and extends upwardly from the bottom wall 14. A cover 18 is hingedly coupled to the container 12 to selectively open or close the container 12. Wheels 20 are attached to the peripheral wall 16 adjacent to the bottom wall 14. A handle 22 is attached to the cover 18 and extends rearwardly of the container 12.

A post 24 has a bottom end 26, a top end 28 and a front side 30. The post 24 has a pair of alternating bends 32, 34 therein. A first one of the bends 32 is approximately equally spaced from the top 28 and bottom 30 ends. The first one of the bends 32 forms an angle in the front side 30 of the post 24 between 135 degrees and 175 degrees. A second one of the bends 34 is between the first one of the bends 32 and the bottom end 26 of the post 24. The second one of the bends 34 forms an angle in a back side 36 of the post between 135 degrees and 175 degrees. The first 32 and second 34 bends provide clearance for the handle 22 of the container 12.

A grip 38 is attached to the top end 28 of the post 24 and extends downwardly on the post 24. The grip 38 has an upper end 40 having an opening 42 extending therethrough. The opening 42 is used for receiving a clasp or hook member to hang the post 24 on a wall when it is not attached to the container 12.

A plate 44 is attached to the front side 30 of the post 24 and extends forward thereof. The plate 44 is positioned adjacent to the bottom end 28 of the post 24 and is positionable under the bottom wall 14 to engage the container 12. A flange 46 is attached to a distal end of the plate 44 with respect to the post 24 and extends upwardly from the plate 44. The post 24 is telescopic and a distance between the plate 44 and the top end 26 of the post 24 is selectively adjustable.

A support 48 is attached to the post 24 and extends laterally away in opposite directions from the front side 30 of the post 24. The support 48 has a plurality of apertures 50 extending therein. A pair of hooks 52 is provided. Each of the hooks 52 includes a base portion 54 and a curved portion 56. The base portions 54 of the hooks 52 are attached to the support 48 so that the curved portions 56 extend forward of the front side 30 of the post 24. The curved portions 56 have a free end 58 directed downwardly toward the plate 44. The hooks 52 engage the handle 22 to releasably secure the container 12 to the post 24. A plurality of fasteners 60 secures the hooks 52 to the support 48. The fasteners 60 are extended through the base portion 54 and into one of the apertures 50. A user of the system 10 can select which apertures 50 are being used to alter the distance between the hooks 52 to allow for handles 22 of various sizes. A distance between hooks 52 and the top end 26 of the post 24 is greater than 12 inches.

An arm 62 has a first end 64 and a second end 66. The first end 64 is hingedly coupled to the post 24 and extends rearward of the front side 30. A wheel 68 is rotatably coupled to the second end 66 of the arm 62. The arm 62 is selectively positioned between a collapsed position extending along the post 24 or in an extended position. The arm 62 forms an angle with the post 24 between 60 degrees and 90 degrees when the arm is in the extended position. When in a collapsed position, the arm 62 will extend downward against the post 24. A brace 70 is attached to and extends between the arm 62 and the post 24. The brace 70 is bendable and releasably retains the arm in the extended position.

In use, the container 12 is used in a conventional manner to hold trash and rubbish. However, when the container 12 is to be moved, a user of the system 10 can tilt the container 12 back by pulling on the post 24 adjacent to the top end 26 to allow the container 12 to be rolled where needed. The post 24 provides additional leverage when the container 12 is being tilted to ensure that the container 12 may still be easily moved when filled with heavy material.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hand truck system for hauling rubbish, said system including:
   a container having a bottom wall and a peripheral wall being attached to and extending upwardly from said bottom wall, a cover being hingedly coupled to said container to selectively open or close said container, a handle being attached to said container, wheels being attached to said peripheral wall adjacent to sad bottom wall;
   a post having a bottom end and a top end, said post having a front side;
   a plate being attached to said front side of said post and extending forward thereof, said plate being positionable under said bottom wall to engage said container;
   a support being attached to said post and extending laterally away in opposite directions from said front side of said post;
   a pair of hooks, each of said hooks including a base portion and a curved portion, said base portions of said hooks being attached to said support so that said curved portions extend forward of said front side of said post, said curved portions having a free end directed downwardly toward said plate, said hooks engaging said handle;
   an arm having a first end and a second end, said first end being hingedly coupled to said post and extending rearward of said front side, a wheel being rotatably coupled to said second end of said arm;
   said wheel attached to said arm and said wheels attached to said container defining the only ground contacts of said system when said container is tilted back on said support;
   said post having a pair of alternating bends therein, a first one of said bends being approximately equally spaced from said top and bottom ends, said first one of said bends forming an angle in said front side of said post between 135 degrees and 175 degrees, a second one of said bends being between said first one of said bends and said bottom end of said post, said second one of said bends forming an angle in a back side of said post between 135 degrees and 175 degrees; and
   a flange being attached to a distal end of said plate with respect to said post, said flange extending upwardly from said plate.

2. The system according to claim 1, further including a flange being attached to a distal end of said plate with respect to said post, said flange extending upwardly from said plate.

3. The system according to claim 1, wherein said post is telescopic and a distance between said plate and said top end of said post being selectively adjustable.

4. The system according to claim 1, further including:
   said support having a plurality of apertures extending therein; and
   a plurality of fasteners securing said hooks to said support, said fasteners being extended through said base portion and into one of said apertures.

5. The system according to claim 1, wherein said arm is selectively positioned between a collapsed position extending along said post or in an extended position, said arm forming an angle with said post between 60 degrees and 90 degrees when said arm is in said extended position.

6. The system according to claim 5, further including a brace being attached to and extending between said arm and said post, said brace releasably retaining said arm in said extended position.

7. The system according to claim 1, wherein said post is telescopic to selectively adjust a distance between said bottom end and said pair of hooks.

8. A hand truck system for hauling rubbish, said system including:
   a container having a bottom wall and a peripheral wall being attached to and extending upwardly from said bottom wall, a cover being hingedly coupled to said container to selectively open or close said container, a handle being attached to said container, wheels being attached to said peripheral wall adjacent to sad bottom wall;
   a post having a bottom end and a top end, said post having a front side, said post having a pair of alternating bends therein, a first one of said bends being approximately equally spaced from said top and bottom ends, said first one of said bends forming an angle in said front side of said post between 135 degrees and 175 degrees, a second one of said bends being between said first one of said bends and said bottom end of said post, said second one of said bends forming an angle in a back side of said post between 135 degrees and 175 degrees;
   a plate being attached to said front side of said post and extending forward thereof, said plate being positioned adjacent to said bottom end of said post, said plate being positionable under said bottom wall to engage said container, a flange being attached to a distal end of said plate with respect to said post, said flange extending upwardly from said plate, said post being telescopic and a distance between said plate and said top end of said post being selectively adjustable;
   a support being attached to said post and extending laterally away in opposite directions from said front side of said post, said support having a plurality of apertures extending therein;
   a pair of hooks, each of said hooks including a base portion and a curved portion, said base portions of said hooks being attached to said support so that said curved portions extend forward of said front side of said post, said curved portions having a free end directed downwardly toward said plate, said hooks engaging said handle, a plurality of fasteners securing said hooks to said support, said fasteners being extended through said base portion and into one of said apertures;
   an arm having a first end and a second end, said first end being hingedly coupled to said post and extending rearward of said front side, a wheel being rotatably coupled to said second end of said arm, said arm being selectively positioned between a collapsed position extending along said post or in an extended position, said arm forming an angle with said post between 60 degrees and 90 degrees when said arm is in said extended position;

said wheel attached to said arm and said wheels attached to said container defining the only ground contacts of said system when said container is tilted back on said support; and a brace being attached to and extending between said arm and said post, said brace releasably retaining said arm in said extended position.

9. The system according to claim 8, wherein said post is telescopic to selectively adjust a distance between said bottom end and said pair of hooks.

* * * * *